INVENTORS
JOSEPH R. PETRELLA
ROBERT A. JANSSON
RAYMOND J. MICKELIC

BY

ATTORNEYS

United States Patent Office 3,522,026
Patented July 28, 1970

---

3,522,026
FABRICATING MULTIPLE GLAZED UNITS
Joseph R. Petrella, Beaver, Robert A. Jansson, Pittsburgh, and Raymond J. Mickelic, Springdale, Pa., assignors to PPG Industries, Inc., Pittsburgh, Pa., a corporation of Pennsylvania
Filed Feb. 6, 1968, Ser. No. 703,463
Int. Cl. C03b 23/20
U.S. Cl. 65—40                                                                10 Claims

ABSTRACT OF THE DISCLOSURE

In the art of electrically welding a multiple glazed unit containing an electroconductive stripe on the margins, applying a viscous dispersion of a finely divided electroconductive material, having a greater durability than the remainder of the electroconductive stripe in the temperature range that is usually experienced during glass welding, to each portion of an edge of a glass sheet facing a welding electrode used to weld the margin of the sheet to that of another sheet during the formation of the multiple glazed unit.

---

Figure 1:
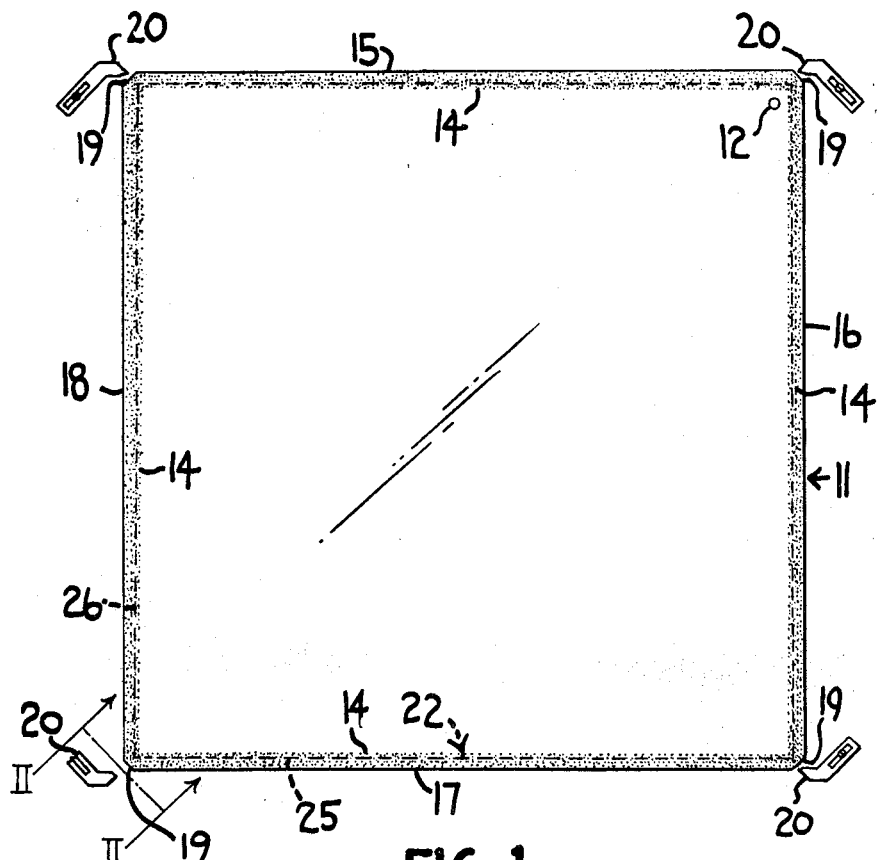

This invention pertains to an improvement in a method of electrically welding together the marginal edges of two or more glass sheets to form a multiple glazed unit.

Multiple glazed units of the class described are usually of rectangular shape for use as windows in buildings, homes and vehicles, although they may be of any desired outline. They comprise two or more glass sheets disposed in spaced relation to enclose an air space therebetween. The air space provides insulation between the two sides of the multiple glazed unit. Such units are also used in the walls of refrigerated chests, show cases and rooms.

Glass units of the type described above have been made by electrically welding two glass sheets together at their marginal edge portions. The basic process for electrically welding a double glazed unit and typical control circuits for controlling the application of electric energy along the marginal edges of the glass sheets are disclosed in U.S. Pat. Nos. 2,389,360 and 2,394,051 to Guyer et al.

In a typical operation to produce such multiple glazed units, a pair of glass sheets are preheated to about 900 degrees Fahrenheit while aligned in superimposed but slightly spaced relation to one another. A pore hole is provided in one of the sheets. The marginal edge portions of the upper preheated sheet are heated intensely until they droop and become welded with the margins of the lower preheated sheet. The upper sheet is pulled upward a short distance to provide a chamber between the sheets and the air pressure within the unit is abruptly increased while the unit is hot as described in U.S. Pat. No. 2,624,979 to Clever et al. The unit is cooled and purged with dry air in a special pressurized chamber and the pore hole is sealed. The unit is then inspected. If it passes the inspection tests, it is packed for shipment.

The heating of the glass sheets that form the double glazed unit is preferably done electrically. For the purpose of heating the glass to the required elevated temperatures, a readily dissipated electroconductive stripe, such as a liquid suspension of finely divided graphite having a predetermined electric resistance per unit length is applied to the marginal edge portions to be heated and welded. A suitable apparatus for applying the stripe of graphitic material is disclosed and claimed in U.S. Pat. No. 2,979,036 to Clever et al.

A pair of glass sheets of the desired size and shape (one sheet about ¼ inch longer and wider than the other sheet) is preferably washed and dried and stripes applied to the marginal edge portions along each side of the upper surface of the upper sheet. The slightly larger sheet is aligned over the slightly smaller sheet with an air space of about ⅟₁₆ inch between the sheets and the peripheral margins of the upper sheet overlapping the peripheral margins of the lower sheet by about ⅛ inch. While the sheets are so arranged, they are preheated to a temperature near the annealing range of the glass. The stripe of graphitic material extends continuously about the marginal edge portion of the upper sheet to form a continuous stripe about ¼ inch wide. By this arrangement, the upper sheet overlaps the lower sheet a distance sufficient to enable the upper sheet to sag and be welded at its marginal edge to the corresponding edge of the lower sheet.

A small piece is removed from each corner of the larger sheet to avoid a concentration of glass at each corner of the welded unit. A diagonal cut about ½ inch long is formed at each corner for this purpose.

The stripes of electroconductive material are of such a resistance that when a potential difference is applied between adjacent electrodes, an electrical arc results from the electrode to the stripes, electrical current is passed through the stripes, the stripes are removed by sublimation and the corresponding marginal portion of the glass becomes sufficiently hot to be electroconductive. The arc then forms between the electrodes subjected to a potential difference and the hot glass margin.

As stated previously, the glass sheet is preheated to a temperature in the vicinity of 900 degrees Fahrenheit. When the glass is at this temperature, a potential difference is applied between electrodes spaced along the periphery of the striped sheet. These electrodes are preferably of the type depicted in the aforesaid U.S. Pat. No. 2,624,979 and are spaced a small fraction of an inch from each of the corners of the upper sheet.

Initially, the current resulting from the voltage applied is conducted along the marginal stripe, thereby heating the stripe and the glass adjacent thereto. Since the current flowing in the glass depends on the electrical resistance of the glass between electrodes and the electrical resistance of the glass varies with the glass temperature, the proportion of current that travels through the glass rather than the stripe increases. At the same time, the heat causes the graphitic stripe to dissipate by the time the temperature of the glass margin increases sufficiently to cause the margin to become very electroconductive.

The application of voltage between adjacent electrodes is cycled so that the marginal edge portion of the glass is heated gradually and substantially uniformly from its preheated temperature of 900 degrees Fahrenheit to a temperature range of about 2300 degrees Fahrenheit to 2500 degrees Fahrenheit. This increase in temperature is a maximum in the marginal edge portion which is initially striped and which becomes the area of the weld and progressively decreases toward the center of the unit. The maximum temperature is attained after the stripes have been sublimated and the marginal edge portions of the upper sheet have been sagged down to engage the corresponding portions of the lower sheet to form a weld along the marginal edge portions of the sheets.

Recently, the demand for double glazed units has increased tremendously. This has required an increase in the rate of production of these units.

When the initial voltage applied between adjacent electrodes in the electric welding operation is increased too rapidly in an effort to accelerate the production rate, the electrode-adjacent portions of the marginal edge portions of the glass sheet become weak and tend to provide sources of breakage in the finished unit. This source of weakness has been attributed to too dense a current flow in the glass and the stripe adjacent the electrodes that causes too steep a thermal gradient in the glass. The present invention provides a simple, yet very effective means of overcoming this tendency of the arcs of electricity between the electrodes and the adjacent glass edge portions to weaken the glass locally while permitting a more rapid heating along the marginal edge portion of glass sheet to be welded.

When the electrodes are located adjacent the corners of the units to be formed, the concentration of localized heat resulting from the early application of a too high voltage causes greater localized heating at the edge corners. The localized heating results in steep thermal gradients causing stresses that weaken the corners.

The present invention suggests minimizing the weakening stresses described above by applying an electroconductive material to the edge surface of at least one of the glass sheets to be welded into a double glazed unit before cycling the voltage. Preferably, the electroconductive material is applied in the form of a viscous slurry of a pulverized electroconductive material that has greater durability than said graphitic stripe applied along the margin. The relatively durable, electroconductive material is applied to a portion of the edge surface facing each electrode. Materials having high electroconductivity spread the current flow over a larger area of the edge surface than the point of the arc that is produced using the prior art technique. The electroconductive coating applied shunts some of the current over the area of application, thus resulting in a more gradual thermal gradient in the affected glass regions, hence producing an improved stress pattern in these critical areas at a faster welding rate.

The present invention will be understood more clearly in the light of a description of a particular embodiment of the invention which follows.

Figure 2:
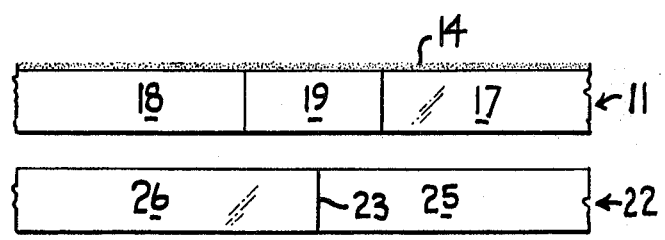

Referring to the drawings which form part of the present description and wherein like reference numbers refer to like structural elements, FIG. 1 is a plan view of an upper, slightly larger sheet of an assembly to be formed into a double glazed unit superimposed over a lower, slightly smaller sheet;

FIG. 2 is an enlarged view of a corner of the sheets along the lines II—II of FIG. 1, showing the superimposed relation of the glass sheets preparatory to welding the two sheets together electrically at their marginal portions.

Referring to the drawings, an upper glass sheet 11 of rectangular outline is provided with a pore hole 12 and has a stripe of graphitic material 14 extending along its upper surface along its marginal edge portions 15, 16, 17 and 18. Each of the corners of the upper sheet 11 are cut away to form oblique corners 19 approximately ½ inch long. Electrodes 20 are disposed adjacent each of the oblique corners 19.

In FIG. 2, a corner portion of a lower glass sheet 22 is shown with the oblique corner 19 of the upper glass sheet 11 disposed in superimposed relationship over the corner 23 formed at the juncture of side edges 25 and 26 of lower sheet 22.

According to the preferred mode of the present invention, the edge surface of each oblique corner 19 of the upper sheet 11 is coated with a mixture of an electroconductive material more durable than stripe 14. The electroconductive material is a finely divided powder dispersed in enough viscous liquid to produce a somewhat flowing mixture having a paste-like consistency. If desired, the lower sheet may have its edge surface portions 25 and 26 adjacent each corner 23 similarly coated.

The present invention in its broadest aspect comprises applying a coating of an electroconductive material that is more durable than the electroconductive stripes 14 in the temperature range that is usually experienced during glass welding along the edge surface of at least one of the sheets forming a multiple glazed unit in each region of the edge surface that faces one of the electrodes used for electric welding prior to applying an electric current through the electroconductive stripes 14. The electric current is applied between said electrodes and through said stripes while said electroconductive material is on the edge surface.

Materials found to be suitable for use as the electroconductive material having the requisite durability at glass welding temperatures needed for the applied coating include finely divided copper, and copper compounds such as copper sulfate and copper oxide, metallic silver, iron, steel, and many other well known electroconductive materials taken alone or in combination with refractory materials. For example, a mixture of carbon black and finely divided silica is more durable than a pure graphite stripe of the same thickness.

Various viscous materials were used to produce a mixture of the proper consistency. Glycerine seemed to be the best material of those tested although motor oil was also found to be suitable. Preferably, the viscous liquid provides a vehicle for applying the durable electroconductive coating uniformly over the critical area and does not harm either the glass or the electroconductive material from the time of application until it volatilizes leaving a conductive coating.

In a particular operation involving the formation of multiple glazing units 14 inches by 14 inches formed of glass sheets ⅛ inch thick, approximately 12 milligrams of copper dust per corner produced satisfactory results. More or less electroconductive material may be required depending on the size of the unit to be fabricated.

A particular embodiment of the present invention has been described for purposes of illustration. It is understood that various changes may be made without departing from the spirit of the invention as defined in the. claimed subject matter that follows.

What is claimed is:

1. In the method of making a double glazed unit which includes holding a pair of glass sheets in closely spaced relation facing one another, applying a readily dissipated electroconductive stripe along the marginal portion of at least one of said sheets, applying electric current through said stripe between electrodes spaced from one another a distance too great to permit arcing therebetween but sufficiently close to said stripe to arc across the space between each said electrode and said stripe, whereby current applied through said stripe dissipates said stripe while heating the marginal portion of the glass sheet adjacent to said stripe to an elevated temperature sufficient to conduct electricity between said electrodes until the marginal portion of the upper sheet sags and fuses to the marginal portion of the lower sheet, the improvement comprising applying a coating containing an electroconductive material, said coating having greater durability in the temperature range that is usually experienced during glass welding than said readily dissipated electroconductive stripe, along the edge surface of at least one of said sheets in each region facing each of said electrodes prior to applying said electric current, said coating being sufficient to provide areas adjacent the electrodes possessing a gradual thermal gradient, and beginning to apply said electric current between said electrodes while said electroconductive material is on said edge surface regions.

2. The improvement according to claim 1, wherein said sheets are of rectangular configuration, said electrodes are disposed adjacent the corners of said sheets and said electroconductive material is applied along the edge surface of at least one of said glass sheets in the vicinity of each corner adjacent each of said electrodes.

3. The improvement according to claim 2, wherein said glass sheets are supported as upper and lower sheets in horizontal positions, said readily dissipated electroconductive stripe is applied along the marginal portion of said upper sheet and said coating of electroconductive material is applied to said regions of said edge surfaces of said upper sheet.

4. The improvement according to claim 2, wherein said coating of electroconductive material is applied in the form of a viscous slurry of an electroconductive material durable at glass welding temperatures taken from the class consisting of finely divided electroconductive metals, metal alloys, metal compounds and mixtures of any of said electroconductive materials with a compatible refractory material.

5. The improvement according to claim 4, wherein said coating of electroconductive material consists essentially of finely divided copper dispersed in a viscous liquid.

6. The improvement according to claim 4, wherein said coatin gof electroconductive material consists essentially of finely divided silver dispersed in a viscous liquid.

7. The improvement according to claim 4, wherein said coating of electroconductive material consists essentially of finely divided iron dispersed in a viscous liquid.

8. The improvement according to claim 4, wherein said coating consists essentially of finely divided copper sulfate dispersed in a viscous liquid.

9. The improvement according to claim 4, wherein said coating consists essentially of finely divided copper oxide dispersed in a viscous liquid.

10. The improvement according to claim 4, wherein said viscous slurry comprises a viscous liquid from the class consisting of glycerine and heavy oils.

References Cited
UNITED STATES PATENTS 2,389,360 11/1945 Guyer et al. _____ 65—58 X
2,470,376 5/1949 Shaw _____ 65—23

S. LEON BASHORE, Primary Examiner

J. B. HARDAWAY, Assistant Examiner

U.S. Cl. X.R.
65—23, 58